Figure 1:
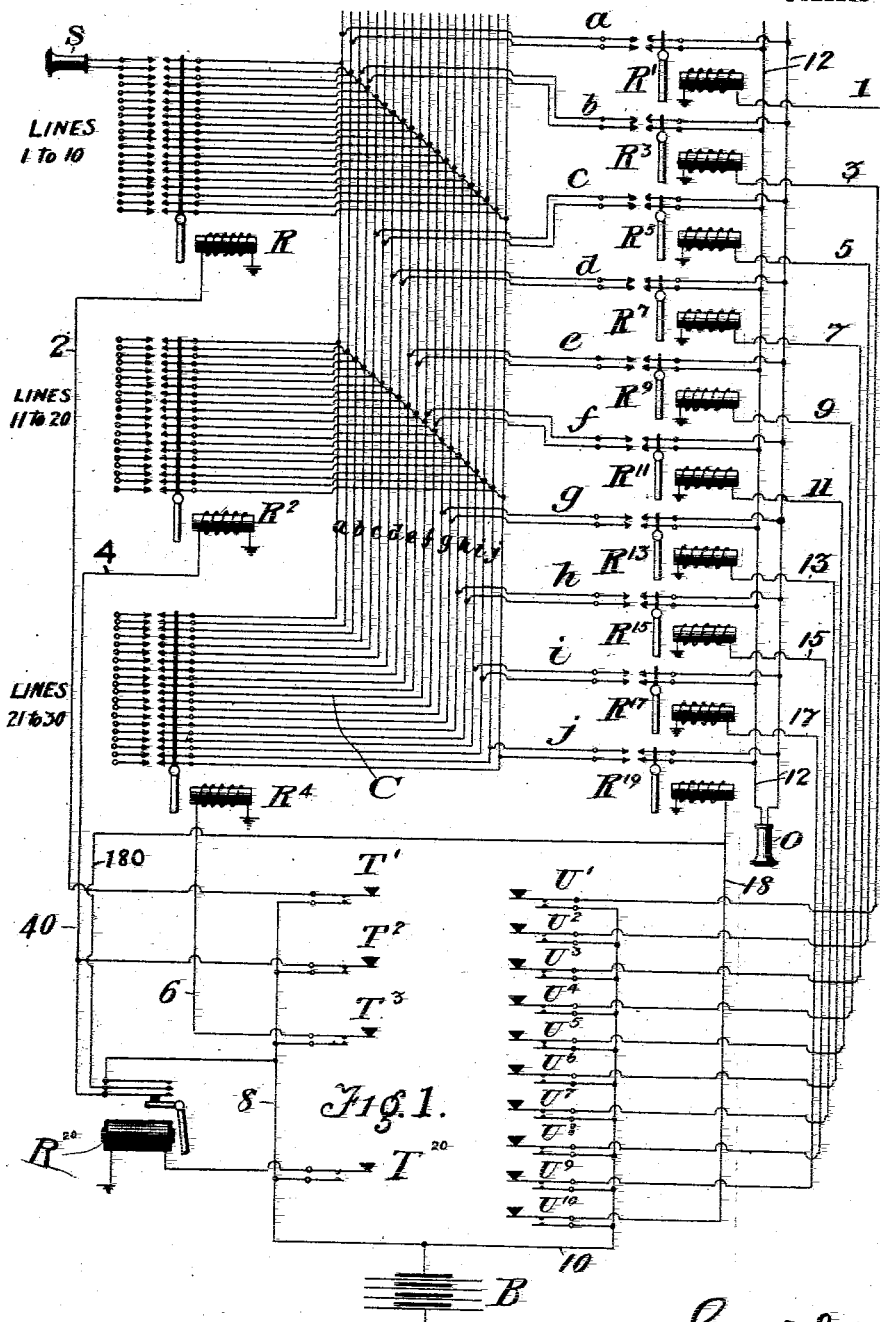

E. E. CLEMENT.
METHOD OF SELECTION IN SYSTEMS OF COMMUNICATION.
APPLICATION FILED OCT. 11, 1906.

939,187.

Patented Nov. 2, 1909.
2 SHEETS—SHEET 1.

E. E. CLEMENT.
METHOD OF SELECTION IN SYSTEMS OF COMMUNICATION.
APPLICATION FILED OCT. 11, 1906.

939,187. Patented Nov. 2, 1909.

UNITED STATES PATENT OFFICE.

EDWARD E. CLEMENT, OF WASHINGTON, DISTRICT OF COLUMBIA, ASSIGNOR TO THE NORTH ELECTRIC COMPANY, OF CLEVELAND, OHIO, A CORPORATION OF OHIO.

METHOD OF SELECTION IN SYSTEMS OF COMMUNICATION.

939,187.     Specification of Letters Patent.     Patented Nov. 2, 1909.

Application filed October 11, 1906. Serial No. 338,464.

*To all whom it may concern:*

Be it known that I, EDWARD E. CLEMENT, a citizen of the United States, residing at Washington, in the District of Columbia, have invented certain new and useful Improvements in Methods of Selection in Systems of Communication, of which the following is a specification, reference being had therein to the accompanying drawing.

My invention relates to systems of communication and has for its object the production of a simple and efficient method of selecting any one of a suitable number of pieces of apparatus or circuits to be affected in due course.

Briefly stated, my invention consists in making combinations of relays which control the apparatus or circuits in question, the number of relays being less than the total number of circuits or pieces of apparatus to be controlled. The relays themselves are actuated or energized in proper order and in the proper combination by means of circuit closers of suitable type. In the present case these circuit closers are illustrated and described as simple keys or push buttons.

For purposes of illustration I have shown one telephone circuit which may be connected to any one of thirty others through the agency of thirteen relays, each relay having its own key, and the number of keys therefore also being thirteen, ten in one set and three in the other.

The underlying principle of the invention is this, that by requiring a circuit to be closed at two points, in order to effect its completion, combinations of circuit closers may be affected. In the present case I divide the thirty individual circuits into three groups of ten each, which are normally disconnected from anything. Each group, however, goes to ten pairs of contacts on a relay which closes them all at once, thereby connecting each circuit to a short branch, corresponding branches from all of the relays being connected together in parallel. The single circuit on the other side of the system, which is to be connected to any one of the thirty mentioned, is connected in multiple to pairs of contacts in all of the ten individual or units relays, and the corresponding contacts are connected separately and respectively to the ten multiple branches of the three group relays.

Assuming that circuit No. 26 is to be connected to the common circuit, the third group of "tens" relays is energized and the 6th single or units relay. The circuit is thus closed through No. 2 branch of the group relay, and through No. 6 extension of the 6th single relay, which is the only one of the group that is closed all the way through.

It is obvious that the circuit closers instead of being keys or buttons may be relay contacts, switch contacts or any other desired circuit closer.

Figure 2:
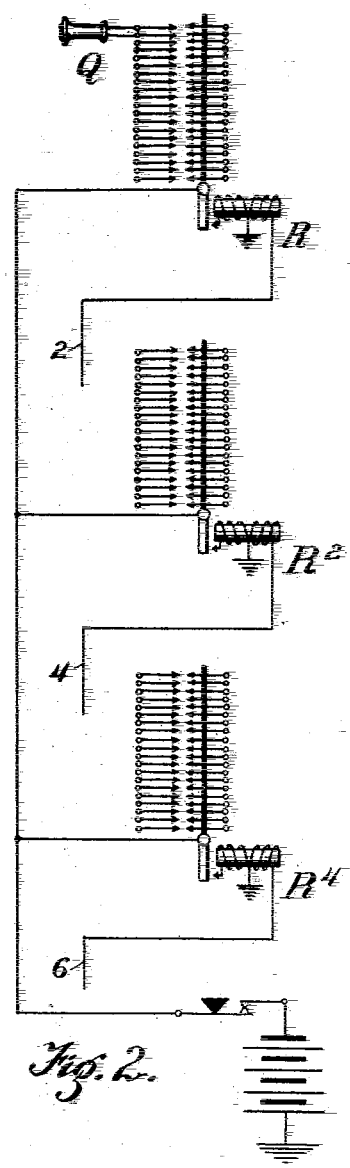
Figure 3:
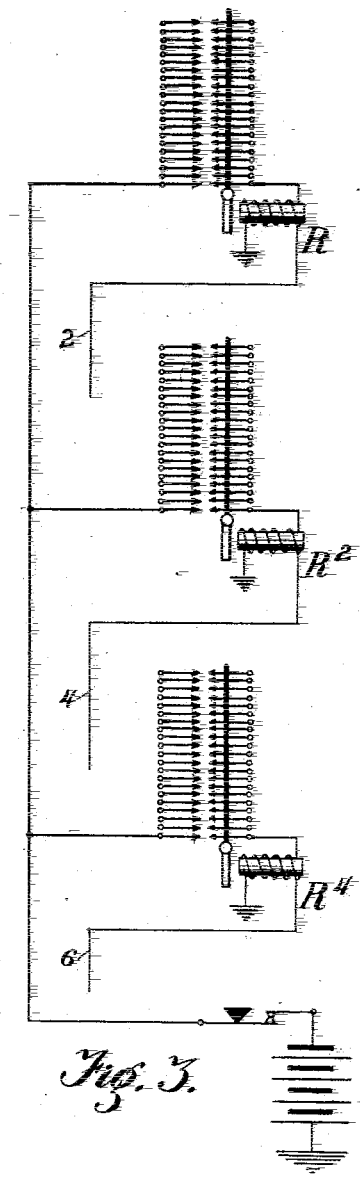

My invention is illustrated in the accompanying drawing in which:

Figure 1 is a diagram showing one embodiment of my invention. Fig. 2 is a view illustrating a locking circuit. Fig. 3 is a view showing a modified form of locking circuit.

Referring to Fig. 1 the diagram shows thirty line terminals on one side, any one of which can be selected and connection effected therewith from the other side. In this diagram, I have shown three relays marked respectively R, $R^2$ and $R^4$, each of which controls ten pairs of contacts. These I call the "tens" relays. On the other side I have shown 10 relays marked $R'$, $R^3$, $R^5$, $R^7$, $R^9$, $R^{11}$, $R^{13}$, $R^{15}$, $R^{17}$ and $R^{19}$, which I shall call "units" relays. Each of these relays controls a single pair of contacts. The reason for showing pairs of contacts is that the circuits controlled by the relays are metallic. The tens relays are connected by wires 2, 4, and 6 respectively to keys $T^1$, $T^2$ and $T^3$. All of these keys are connected by a common wire 8 to a suitable battery B. The return from the relays to the battery is effected through the ground, but of course may be by means of a wire or wires if desired. The units relays $R'$, $R^3$, $R^5$, etc. are connected through wires 1, 3, 5, 7, 9, 11, 13, 15, 17 and 19 to the keys $U^1$, $U^2$, $U^3$, $U^4$, $U^5$, $U^6$, $U^7$, $U^8$, $U^9$, $U^{10}$, respectively. These keys are connected to the battery B through a common wire 10. Between the two sets of relays, a cable C passes, which is composed of ten pairs of wires, which may be designated by the letters $a$, $b$, $c$, $d$, $e$, $f$, $g$, $h$, $i$, $j$, and which are connected and disposed as follows: all of the pairs are multiplied to the ten pairs of contacts on each of the tens relays. Thus, the first pair $a$ goes to the first pair of contacts on each of the relays R, $R^2$, $R^4$. The second pair $b$ goes to the second pair of contacts on each of these relays, and so on. The corresponding or coöperating contacts of the relays are connected to the individual lines or circuits to be selected. Thus, in the relay R appear the terminals of lines #1 to #10; in relay R² appear the terminals of lines #11 to #20; and in the relay R⁴ appear the terminals of lines #21 to #30. Each of the pairs $a$, $b$, $c$, etc., is connected to the single pair of contacts in one of the units relays R', R³ R⁵, etc. Thus, the pair $a$ appears only in the relay R', the pair $f$ appears only in the relay R¹¹ and so forth. I have shown the contacts of all the units relays connected on one side to a common circuit 12, to which is connected a telephone O. I have shown line #1, which is the first outside line on relay R, connected to a telephone S, and it is to be understood that all the other terminals may be connected to similar or any desired apparatus.

The operation of selecting any one of the lines represented on the tens relays is as follows: Suppose it be desired to connect the telephone O with the telephone S; the line circuit leading to S is #1, which appears only in the terminals on relay R. Hence the operator presses the key T' to energize the relay R through the following circuit; B, 8, T', 2, R and ground. Relay R in pulling up connects all of the lines #1 to #10 on to the pairs of wire $a$, $b$, $c$, $d$, etc., in the cable C. As these pairs are distributed among the relays R', R³, R⁵, etc., it follows that we have thus connected the lines #1 to #10 to the units relays respectively from R' to R¹⁰ and by energizing any desired one of these relays we may select any one of the individual lines which have become thus connected. In the present case the operator depresses the key U', which closes the circuit of the relay R' as follows: B, 10, U', 1, R' and ground. Relay R' in pulling up connects the pair of wires $a$ to the pair 12 leading to the telephone O, and thus as long as the two keys T' and U' are depressed this connection will remain established.

To take another example, suppose it be desired to select and connect with line #17; the keys T², and U⁷ are depressed. Similarly by varying the combination of tens and units keys and thereby energizing the tens and units relays in corresponding combinations, any desired line or lines may be selected.

I have employed the keys herein shown for the purposes of illustration because they constitute the simplest and best known form of circuit closers, but in practice other forms of circuit closers are more frequently employed. Thus in adapting this arrangement to a signaling or telephone system, instead of depressing two keys in order to select a desired circuit, it is simplest to simultaneously close two contacts constituting terminals of the desired relays. Such an arrangement which is shown in my prior application 296,853, filed January 19, 1906, is also shown herein in respect to line 20. A key T²⁰ controls a relay R²⁰, which when energized completes the battery circuit through wires 40 and 180 to the relay circuits 4 and 18, simultaneously. Thus the depression of the key T²⁰ or the energization of the relay R²⁰ will always connect the line 20 to the circuit 12.

It will be understood that the keys and the relays shown herein are merely used for purposes of illustration, the invention lying not in the circuit closers used in the initial control of the circuit system, but in the arrangement of the tens and units relays, and their circuits, used in various combinations so as to produce a total number of possible selections and connections greater than the number of relays employed. It should be observed that the relation of these relays is not limited to a decimal relation. Thus, the number of contacts carried on the relays R, R², etc., is limited only by the requirements of good practice, and the possibility of obtaining sufficient power in the actuating electromagnet. Similarly, the number of relays R, R² and R⁴ which may be employed is not limited, nor is the number of the units relays R', R³, etc. For example, twenty relays R, R², etc., could be provided each of which had its ten pairs of contacts multipled in a manner similar to those in the figure. Any one of two hundred lines could thus be selected. Or, ten relays R, R², etc., may be provided each with twenty pairs of contacts. It would then be necessary to provide twenty pairs of wires in the cable C, and twenty individual relays R', R³, R⁵, etc. Numerous other arrangements will suggest themselves.

In applying this invention to a telephone exchange, the circuits 1 to 30 shown herein would be subscribers' lines, and the circuit 12 a trunk or other connective circuit.

I have described my controlling relays as single wound, and depending entirely upon the selective circuit closers. By providing each relay with a second winding and a pair of controlling contacts therefor on its armature, and by running a common battery wire to all of these contacts as shown in Fig. 2, each relay may be made to close its own circuit when it is energized, so that it will remain energized as long as the common battery locking wire is intact. To unlock the relay I place a key in this common battery wire so that it may be opened at will for restoring purposes. A still simpler arrangement, which is also self-locking, is to connect one of the contacts on the relay armature with the battery wire, and the other with a point on the battery side of the single winding. This arrangement is shown in Fig. 3. Thus a temporary closure of the relay circuit through the controlling device will cause it to pull up and maintain the battery connections on its single winding as long as the locking wire is intact. Such self-locking relays are well known in the art, but their application to my type of selecting system I consider involves invention, and I shall therefore claim the combination.

Having thus described my invention what I claim and desire to secure by Letters Patent is:

1. The method of interconnection of electrical circuits and apparatus which consists in selecting one of a plurality of units by first segregating a group containing said unit, and predetermining the association of said group with an intermediate fractional agency common to all the groups, then segregating a unit in said intermediate agency corresponding to the particular unit in the selected group, and finally determining the association of said selected unit with a connective agency common to all the units of the intermediate agency.

2. The method of selection and interconnection of electrical agencies which consists in selectively converging a plurality of multiple groups of units upon a common intermediate fractional agency, diverging the units of said intermediate agency, selectively determining their individual segregation, as well as the segregation of a predetermined group, and thereby the connection of a unit in said group through the intermediate agency and the segregated unit thereof to a final agency common to all the groups and all the units.

In testimony whereof I affix my signature in presence of two witnesses.

EDWARD E. CLEMENT.

Witnesses:
E. EDMONSTON, Jr.,
JAMES H. MARR.